United States Patent
Kong et al.

(10) Patent No.: US 10,505,960 B2
(45) Date of Patent: Dec. 10, 2019

(54) MALWARE DETECTION BY EXPLOITING MALWARE RE-COMPOSITION VARIATIONS USING FEATURE EVOLUTIONS AND CONFUSIONS

(71) Applicant: Samsung Electronics Co., Ltd., Suwon-si, Gyeonggi-do (KR)

(72) Inventors: Deguang Kong, San Jose, CA (US); Wei Yang, Frisco, TX (US); Hongxia Jin, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 196 days.

(21) Appl. No.: 15/388,460

(22) Filed: Dec. 22, 2016

(65) Prior Publication Data

US 2017/0353481 A1 Dec. 7, 2017

Related U.S. Application Data

(60) Provisional application No. 62/346,356, filed on Jun. 6, 2016.

(51) Int. Cl.
| | | |
|---|---|---|
| H04L 29/06 | (2006.01) | |
| G06N 99/00 | (2019.01) | |
| G06N 20/00 | (2019.01) | |
| H04W 12/12 | (2009.01) | |

(52) U.S. Cl.
CPC ......... *H04L 63/1425* (2013.01); *G06N 20/00* (2019.01); *H04L 63/145* (2013.01); *H04W 12/1208* (2019.01)

(58) Field of Classification Search
CPC .. H04L 63/1425; H04L 63/145; G06N 99/005

USPC ..................................... 726/23, 24
See application file for complete search history.

(56) References Cited

U.S. PATENT DOCUMENTS

| | | | |
|---|---|---|---|
| 7,370,361 B2 | 5/2008 | De Los Santos et al. | |
| 8,312,545 B2 | 11/2012 | Tuvell et al. | |
| 8,321,941 B2 | 11/2012 | Tuvell et al. | |
| 8,332,945 B2 | 12/2012 | Kim et al. | |

(Continued)

FOREIGN PATENT DOCUMENTS

KR        20140142806 A        12/2014

OTHER PUBLICATIONS

International Search Report and Written Opinion dated Sep. 12, 2017 for International Application PCT/KR2017/005864 from Korean intellectual Property Office, pp. 1-6, Republic of Korea.

*Primary Examiner* — Jahangir Kabir
(74) *Attorney, Agent, or Firm* — Sherman IP LLP; Kenneth L. Sherman; Hemavathy Perumal

(57) ABSTRACT

One embodiment provides a method comprising, in a training phase, receiving one or more malware samples, extracting multi-aspect features of malicious behaviors triggered by the malware samples, determining evolution patterns of the malware samples based on the multi-aspect features, and predicting mutations of the malware samples based on the evolution patterns. Another embodiment provides a method comprising, in a testing phase, receiving a new mobile application, extracting a first set of multi-aspect features for the new mobile application using a learned feature model, and determining whether the new mobile application is a mutation of a malicious application using a learned classification model and the first set of multi-aspect features.

20 Claims, 15 Drawing Sheets

(56) References Cited

U.S. PATENT DOCUMENTS

| | | | |
|---|---|---|---|
| 8,365,283 B1* | 1/2013 | Satish | G06F 21/564 |
| | | | 713/152 |
| 8,375,450 B1 | 2/2013 | Oliver | |
| 8,595,840 B1* | 11/2013 | Malibiran | G06F 21/554 |
| | | | 726/22 |
| 8,683,216 B2 | 3/2014 | Harmonen | |
| 8,769,692 B1 | 7/2014 | Muttik | |
| 8,839,432 B1* | 9/2014 | Patil | G06F 21/577 |
| | | | 713/188 |
| 8,904,525 B1 | 12/2014 | Hodgman et al. | |
| 9,104,871 B2 | 8/2015 | Tuvell et al. | |
| 9,177,144 B2 | 11/2015 | Alme | |
| 9,350,747 B2 | 5/2016 | McLarnon et al. | |
| 9,519,780 B1* | 12/2016 | Dong | G06F 21/564 |
| 2007/0094734 A1 | 4/2007 | Mangione-Smith et al. | |
| 2010/0180344 A1 | 7/2010 | Malyshev et al. | |
| 2013/0111547 A1 | 5/2013 | Kraemer | |
| 2013/0305377 A1* | 11/2013 | Herz | G06Q 20/201 |
| | | | 726/25 |
| 2015/0058984 A1 | 2/2015 | Shen et al. | |
| 2015/0150131 A1* | 5/2015 | Boutnaru | G06F 21/567 |
| | | | 726/23 |
| 2015/0172300 A1 | 6/2015 | Cochenour | |
| 2016/0021174 A1 | 1/2016 | De Los Santos Vilchez et al. | |
| 2016/0057159 A1 | 2/2016 | Yin et al. | |
| 2016/0088012 A1 | 3/2016 | Casey et al. | |
| 2016/0119366 A1 | 4/2016 | Alme | |

* cited by examiner

500

| file name\features | Resource feature | | | ... | Locale feature | | | ... | Dependency feature | | family |
|---|---|---|---|---|---|---|---|---|---|---|---|
| | f1 | f2 | f3 | ... | fk | f(k+1) | f(k+2) | ... | f678 | f679 | |
| 3df0a3b02abc3dbedc1fd75aef2fedf0.apk | 1 | 0 | 1 | ... | 0 | 0 | 1 | ... | 1 | 0 | Domob.F |
| 3df0a3b02abc3dbedc1fd75aef2fedf0.apk | 0 | 1 | 1 | ... | 0 | 1 | 1 | ... | 0 | 1 | Domob.F |
| 3df0a3b02abc3dbedc1fd75aef2fedf0.apk | 0 | 0 | 1 | ... | 1 | 1 | 0 | ... | 1 | 0 | Domob.F |
| MRV 1 | 1 | 1 | 0 | ... | 0 | 0 | 0 | ... | 0 | 1 | Domob.F |
| MRV 2 | 1 | 0 | 1 | ... | 1 | 0 | 1 | ... | 1 | 0 | Domob.F |

510 (Mutation)

Malware Sample

FIG. 13

| App | Ground-truth | $f_1$ | $f_2$ | $f_3$ | Detection Results |
|---|---|---|---|---|---|
| $M_1$ | Malware | $a$ | $b$ | $c$ | Malware |
| $M_2$ | Malware | $a$ | $b$ | $c'$ | Benign |
| $B_1$ | Benign | $a'$ | $b$ | $c'$ | Benign |
| $M_3$ | Malware | $a'$ | $b'$ | $c$ | Malware |
| $M_v$ | Malware | $a'$ | $b'$ | $c'$ | ? |

FIG. 14

MALWARE DETECTION BY EXPLOITING MALWARE RE-COMPOSITION VARIATIONS USING FEATURE EVOLUTIONS AND CONFUSIONS

CROSS REFERENCE TO RELATED APPLICATIONS

This application claims priority from U.S. Provisional Patent Application Ser. No. 62/346,356, filed on Jun. 6, 2016, incorporated herein by reference.

TECHNICAL FIELD

One or more embodiments relate generally to malware detection, and in particular, exploiting malware re-composition variations using feature evolutions and confusions.

BACKGROUND

Malware is an application program that invokes malicious functionality or malicious behavior. The number of malware instances occurring on mobile and/or Internet-of-Things (IoT) devices has grown exponentially in recent years.

SUMMARY

One embodiment provides a method comprising, in a training phase, receiving one or more malware samples, extracting multi-aspect features of malicious behaviors triggered by the malware samples, determining evolution patterns of the malware samples based on the multi-aspect features, and predicting mutations of the malware samples based on the evolution patterns.

Another embodiment provides a method comprising, in a testing phase, receiving a new mobile application, extracting a first set of multi-aspect features for the new mobile application using a learned feature model, and determining whether the new mobile application is a mutation of a malicious application using a learned classification model and the first set of multi-aspect features.

These and other features, aspects and advantages of the one or more embodiments will become understood with reference to the following description, appended claims and accompanying figures.

BRIEF DESCRIPTION OF THE DRAWINGS

FIG. 13 illustrates an example table maintaining feature vectors for a malware sample and mutations of the malware sample, in one or more embodiments;

FIG. 14 illustrates example feature vectors for a malware sample and mutations of the malware sample, in one or more embodiments;

DETAILED DESCRIPTION

Figure 1:
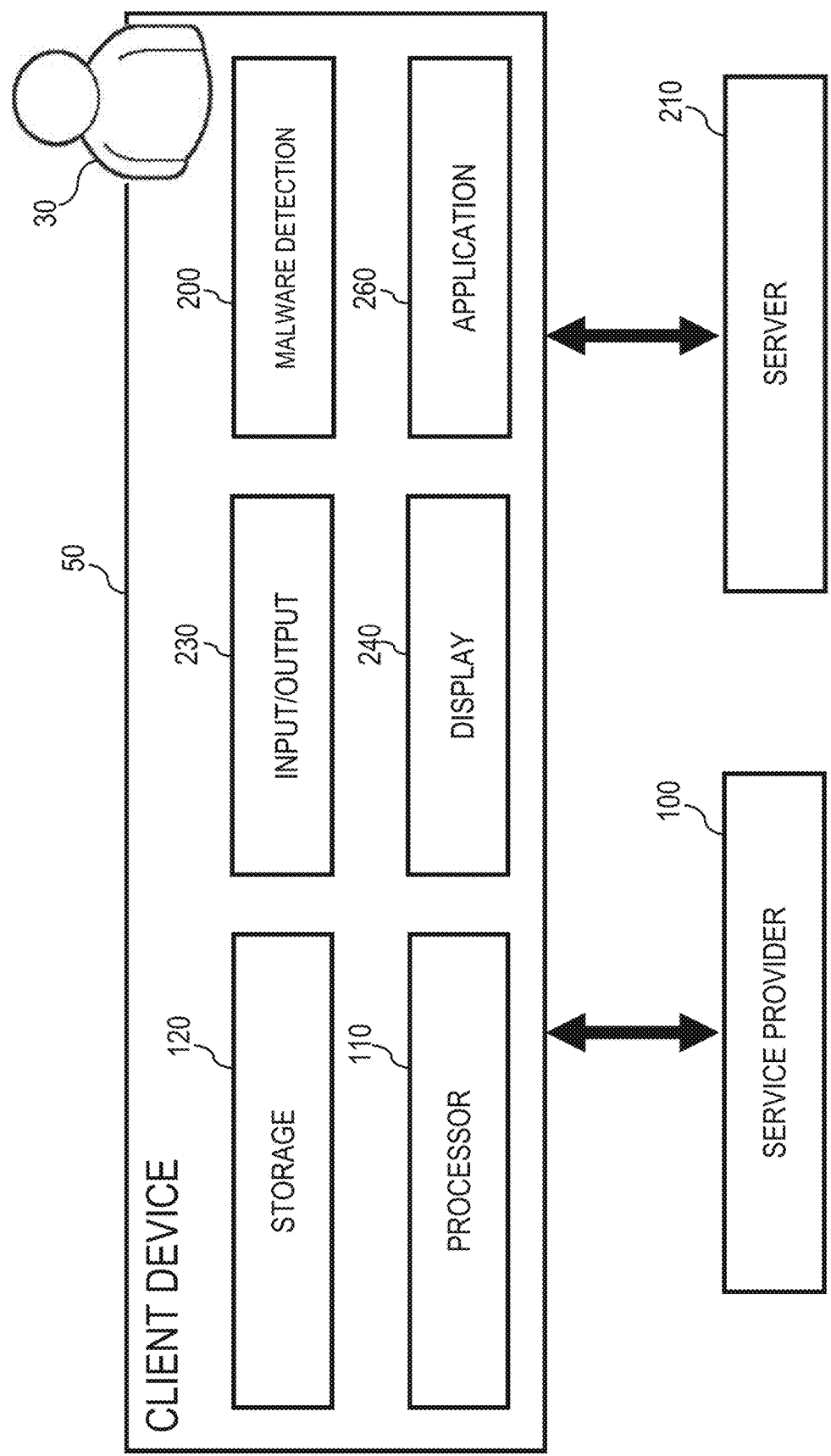
FIG. 1 illustrates an example client device including a malware detection system 200, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to malware detection, and in particular, exploiting malware re-composition variations using feature evolutions and confusions. One embodiment provides a method comprising, in a training phase, receiving one or more malware samples, extracting multi-aspect features of malicious behaviors triggered by the malware samples, determining evolution patterns of the malware samples based on the multi-aspect features, and predicting mutations of the malware samples based on the evolution patterns. Another embodiment provides a method comprising, in a testing phase, receiving a new mobile application, extracting a first set of multi-aspect features for the new mobile application using a learned feature model, and determining whether the new mobile application is a mutation of a malicious application using a learned classification model and the first set of multi-aspect features.

For expository purposes, the term "client device" as used in this specification generally refers to a mobile or Internet-of-Things (IoT) device. Examples of client devices include, but are not limited to, smart phones, smart watches, smart vehicles, smart houses, etc.

For expository purposes, the terms "mobile application" and "mobile app" as used in this specification generally refer to a software application program residing on a client device. The terms "malware", "malicious application", and "malicious app" as used in this specification generally refer to a mobile app that invokes malicious behaviors (i.e., malicious functionalities) on a client device. Examples of malicious behaviors include, but are not limited to, monitoring user behavior, private information leakage (e.g., stealing personal information and sending the personal information to third parties without user knowledge), changing signal strength of a client device, remotely controlling a client device, etc. Examples of malicious apps include, but are not limited to, malicious Android apps, such as adware. The terms "mutation", "malware variation", and "mutated malware" as used in this specification generally refer to a new variant/type of malware that preserves malicious behaviors of the malware. The terms "benign application" and "benign app" as used in this specification generally refer to a mobile app that does not invoke malicious behaviors on a client device.

Malware evolves quickly and becomes more sophisticated over time. Conventional techniques for malware defense employ syntactic signatures (e.g., MD5) or semantic analysis to prevent malware attacks. Malware defense scenarios (e.g., signature based approach or machine learning based approach) are derived from existing malware attacks. Such conventional techniques, however, do not provide effective methods for detecting and protecting against "zero-day" malware attacks as these techniques cannot detect obfuscated, mutated malware on client devices. As such, these conventional techniques are always one-step behind malware attacks. There are no existing solutions that constrain evolution of malware to explore new malware attacks.

For equipment manufacturers of client devices, malicious applications are a primary threat to device security. A malicious application on a client device may achieve malicious intent without user notice of anomalies by invoking imperceptible system events on the device, such as malicious behaviors via background events. Malware may also invoke financially motivated malicious behaviors. For example, a malicious application on a client device may hide in the background and monitor short messaging service (SMS) messages between professionals (e.g., physicians exchanging personal health information). As another example, a malicious application on a client device may hide in the background and conceal functions from a user or feed a benign application on the same device with advertising information.

A malicious application on a client device may launch malware attacks that evade detection using either feature evolution or feature confusion. In feature evolution, the malicious application evades detection by evolving its features at an intra-family level (i.e., malware from the same malware family) and an inter-family level (i.e., malware from different malware families). In feature confusion, the malicious application evades detection by mutating its features based on features of one or more benign applications that may reside on the same device.

One or more embodiments provide a framework for proactive malware detection on client devices that accurately characterizes and differentiates contextual and essential features of malicious behaviors. The framework is robust and resilient to malware attacks that result from feature evolution or feature confusion. The framework captures activation events, context factors, and environment factors that are related to malicious behaviors of malware. The framework provides malware evolution pattern analysis by leveraging program analysis (e.g., information flow analysis) and statistical machine learning techniques (e.g., phylogenetic analysis) to automatically capture malicious behaviors and automatically learn/infer evolution patterns of malware from the same family, thereby gaining valuable insights on detection of malware and how to predict "zero-day" malware attacks and new malware mutations/variants.

The framework determines distances between different malware in relation to malicious behaviors. The framework learns phylogenetic evolution relations based on statistical analysis from semantics of malicious apps.

The operations of the framework are automatic and do not require any human intervention. In a dynamic environment where there are new mobile applications, detection of whether the new mobile applications are benign or malicious is automatically done. The framework automatically attributes/assigns a new mobile application to a corresponding family with high accuracy. For example, the framework automatically labels malware to its corresponding families and summarizes its evolution patterns.

The framework provides improved end-user mobile device security management by detection and removal of malicious apps on mobile devices. The framework provides a more accurate, deep-analyzed, obfuscation-resilient way for malware detection. For example, the framework is resilient to different kinds of obfuscations (e.g., metamorphism and polymorphism).

FIG. 1 illustrates an example client device 50 including a malware detection system 200, in one or more embodiments. The client device 50 comprises one or more processor units 110 and one or more storage units 120. The client device 50 is configured to exchange data with one or more remote service providers 100 and one or more remote servers 210 over a connection (e.g., a wireless connection, a wired connection, or a combination of the two).

In one embodiment, one or more mobile apps 260 reside on the client device 50. Each mobile app 260 is associated with a particular remote service provider 100; the mobile app 260 may be invoked to request one or more services offered by the remote service provider 100. Each mobile app 260 is either a benign app 270 or a malicious app 280.

The client device 50 further comprises a malware detection system 200. As described in detail later herein, the malware detection system 200 is configured to detect malware among the mobile applications 260. The malware detection system 200 is compatible with different types of remote service providers 100, and does not require any changes at the remote service provider 100. The malware detection system 200 is suitable for use with different applications and/or services (e.g., health & fitness applications, social services, travel applications, etc.).

The client device 50 further comprises a display 240 configured for displaying video, graphics, text, and other data types. The display 240 is configured to display one or more user interfaces provided by the malware detection system 200.

The client device 50 further comprises one or more input/output (I/O) units 230. In one embodiment, the I/O units 230 comprise at least one user interface devices, such as a keyboard, a touch screen, a keypad, a pointing device, a mouse, etc. A user 30 may enter/specify input via the I/O units 230.

Figure 2:
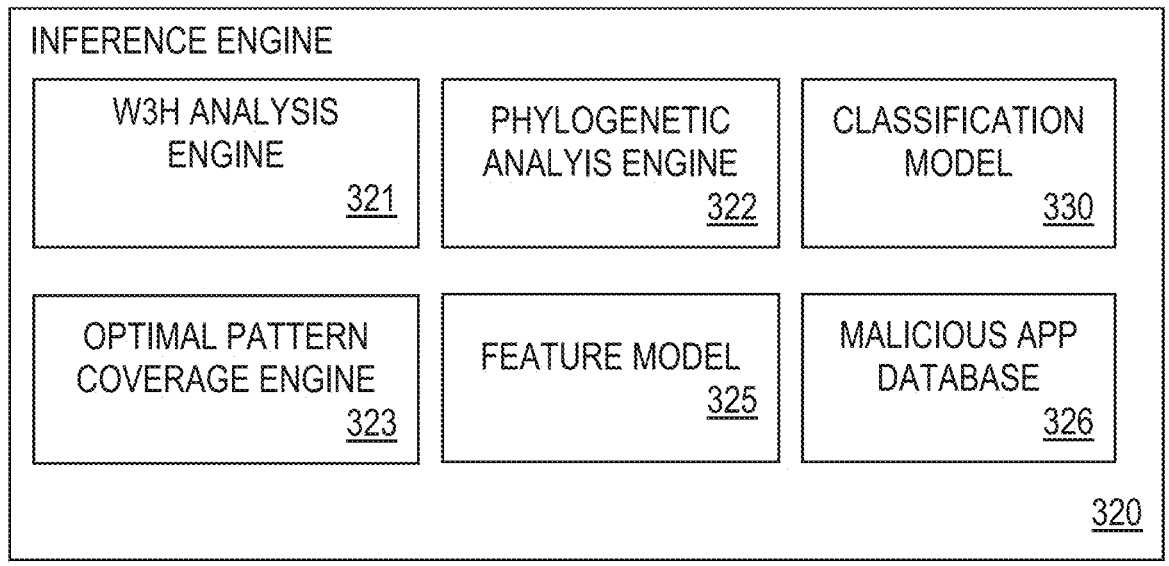
FIG. 2 illustrates an example inference engine, in one or more embodiments.

FIG. 2 illustrates an example inference engine 320, in one or more embodiments. In one embodiment, the inference engine 320 is trained offline (i.e., not on the client device 50). For example, the inference engine 320 may be trained on a server device 210. After training, one or more components of the inference engine 320 may be loaded onto/downloaded to the client device 50 as a portion of the malware detection system 200.

To assist mitigation of malware, the inference engine 320 is configured to leverage program analysis (e.g., information flow analysis) and statistical machine learning techniques (e.g., phylogenetic analysis) to automatically capture malicious behaviors and automatically infer evolution patterns of malware. The inference engine 320 comprises at least one of the following components: (1) a what, where, when, and how (W3H) analysis engine 321 for analyzing malicious behaviors of malware from four different aspects—what, where, when, and how ("W3H analysis"), (2) a phylogenetic analysis engine 322 for phylogenetic analysis of malware, and (3) an optimal pattern coverage engine 323 for pattern mutation analysis.

In one embodiment, malware detection is divided into at least two operating phases—a training phase and a testing phase. In the training phase, one or more malware samples are fed to the inference engine 320. The malware samples comprises at least one of the following: one or more malicious apps 270, one or more mutations of the malicious apps 270, and one or more benign apps 280. Based on the malware samples, the inference engine 320 extracts "robust" patterns of malware by automatically conducting a W3H analysis, a phylogenetic analysis, and a pattern mutation analysis.

Specifically, in the training phase, for each malware sample, the W3H analysis engine 321 extracts, characterizes, and differentiates contextual and essential features of malicious behaviors triggered by the malware sample (e.g., resources the malware sample accessed) by automatically conducting W3H analysis based on static information flow analysis of the malware sample (i.e., how the sensitive resources are propagated).

In one embodiment, the features extracted by the W3H analysis engine 321 are transformed into one or more multi-aspect feature vectors representing at least four different aspects: (1) resource features indicating what types/kinds of malicious behaviors are triggered by the malware sample, (2) locale features indicating where the malicious behaviors are triggered (e.g., in which method or component the malicious behaviors occurred), (3) temporal features indicating when the malicious behaviors are triggered (e.g., pre-conditions that must be satisfied before the malicious behaviors are triggered), and (4) dependency features indicating how the malicious behaviors are triggered (e.g., in which condition the malicious behaviors are triggered to obtain over-privileged operations). These aspects represent abstractions of the malicious behaviors in modeling contexts that the malicious behaviors are triggered. As described in detail later herein, the contexts may include activation events, environmental attributes, accessed resources, and other contexts that may be viewed as strong indicators of malicious behaviors.

In the training phase, the phylogenetic analysis engine 322 automatically learns semantic similarities between malware samples from the same malware family, semantic similarities between malware samples from different malware families, and evolutionary chains/lineages for malware samples from the same malware family. The phylogenetic analysis engine 322 constructs mathematical models that describe evolution patterns of the malware samples in order to estimate/predict new malware from a same malware family.

Specifically, in the training phase, feature vectors for malicious behaviors triggered by each malware sample are fed to the phylogenetic analysis engine 322. The phylogenetic analysis engine 322 automatically conducts phylogenetic analysis of the malware samples based on the feature vectors.

In one embodiment, the phylogenetic analysis engine 322 conducts phylogenetic analysis of the malware samples utilizing a distance-based method to capture distances between different malware samples. The phylogenetic analysis engine 322 constructs mathematical models based on the feature vectors. Let each feature vector be a $p^{th}$ dimensional feature vector, wherein p is a positive integer. The phylogenetic analysis engine 322 encodes a distance between two different malware samples as an "edited distance" that quantifies how dissimilar the two malware samples are to each another. The phylogenetic analysis engine 322 determines an edited distance between two different malware samples by counting a minimum number of operations required to transform one malware sample into the other malware sample. For example, for each feature variable, the phylogenetic analysis engine 322 determines how many substitution operations are needed to transform one malware sample into the other malware sample.

Based on the distances captured between different malware samples, the phylogenetic analysis engine 322 constructs a phylogenetic tree for a malware family based on an estimated/expected number of substitution operations needed per position that have occurred along evolutionary chains/lineages between a malware sample and its most recent common ancestor, if any. For each malware family, the phylogenetic analysis engine 322 encodes the following information: (1) common features for the malware family as representative feature variables, and (2) for each representative feature variable, a corresponding confidence value, wherein the confidence value indicates how likely the representative feature variable appears in malware from the malware family.

Table 1 below provides, for a malware family, an example set of representative feature variables and corresponding confidence values.

TABLE 1

| Feature Variables | Confidence Values |
|---|---|
| Entering app events | 1 |
| Click button events | 0.3 |
| Calendar context | 0.85 |
| . . . | . . . |

Malware may evolve by adding new features while preserving partial old features. In the training phase, W3H patterns resulting from the W3H analysis are fed to the optimal pattern coverage engine 323 for pattern mutation and maximal pattern coverage analysis. Based on the W3H patterns, the optimal pattern coverage engine 323 generates malware re-composition variations (MRVs) of the malware samples. The optimal pattern coverage engine 323 systematically constructs new variants (i.e., types) of malware using decompositions of features extracted from the malware samples. The optimal pattern coverage engine 323 generates all possible mutations and evolutions of the malware samples, resulting in maximal pattern coverage (i.e., optimal coverage patterns) for each malware family.

The optimal pattern coverage engine 323 considers all different pattern variable mutations by covering evolving spaces of malware in order to predict "zero-day" attacks (i.e., resurging malware attacks (RMAs)). RMAs systematically reconstruct new malware mutations using disassembled parts of existing malicious behavior patterns to evade existing malware detection techniques/models. In one embodiment, for each malware family, the optimal pattern coverage engine 323 extends an evolving space of the malware family by flipping each bit in malicious behavior patterns of the malware family.

In the training phase, the optimal pattern coverage engine 323 generates, for each malware sample, a corresponding MRV that maintains critical features (e.g., resource features)

of the original malware sample (i.e., preserves malicious behaviors) and re-composites other non-critical features (e.g., contextual features). Specifically, the optimal pattern coverage engine 323 is configured to: (1) search a feasible mutation/transformation strategy for the malware sample (i.e., synthesizing a mutation/transformation strategy), (2) conduct program transplantation/transformation to mutate contextual features of malicious behaviors triggered by the malware sample, resulting in one or more mutations, and (3) test the mutations.

In one embodiment, in synthesizing a mutation/transformation strategy for a malware sample, at least one of the following conditions must be satisfied: (1) mutations must maintain malicious behaviors triggered by the original malware sample under specific contexts to avoid user attention and gain maximum profits, and (2) mutations should be robust enough to be installed and executed on an operating system of the client device 50.

In one embodiment, the optimal pattern coverage engine 323 generates, for each malware sample, one or more mutations of the malware sample utilizing a program transplantation framework that applies a transplantation/transformation process to mutate one or more features of malicious behaviors triggered by the malware sample. A transplantation process comprises identification of a code area that needs to be transplanted, extraction of the code area, identification of an insertion point, and adaption of the transplanted code area.

The program transplantation framework maintains/preserves the malicious behaviors and changes contexts of the malicious behaviors. Specifically, the program transplantation framework is configured to: (1) transplant the malicious behaviors to different contexts of the malware sample, and (2) transplant contextual features of another mobile app 260 to existing/current contexts. In one embodiment, the transplantation/transformation process applied comprises at least one of inter-method, inter-component, and inter-app transplantation.

Inter-app transplantation is used to migrate a dependency feature of a malicious behavior in a mobile app to another mobile app with identical malicious behavior.

Inter-component transplantation migrates malicious behaviors from one component to another component in the same mobile app. Inter-component transplantation can be used to mutate values of temporal features and locale features.

Inter-method transplantation refers to migration of malicious behaviors (i.e., resource features) from a method to another method in the same component. Such transplantation is usually used to change temporal features.

The optimal pattern coverage engine 323 mutates features of malicious behaviors triggered by a malware sample from its original values to mutated values that are less differentiable for malware detection. The optimal pattern coverage engine 323 also mutates the features to "blind spots" of malware detection models/techniques based on phylogenetic analysis of the malware samples.

In one embodiment, the optimal pattern coverage engine 323 is configured to generate a report for indicative of evolution patterns of a malicious app 270.

To generate mutations that reflect feature evolution, the optimal pattern coverage engine 323 identifies a set of feature vectors ("evolution feature set") that evolved in the phylogenetic analysis of the malware samples. Each feature vector of the evolution feature set is evolved either at an intra-family level or an inter-family level. The optimal pattern coverage engine 323 determines, for each feature vector of the evolution feature set, a corresponding evolution weight indicative of a number of evolutions of the feature vector.

To generate mutations that reflect feature confusion, the optimal pattern coverage engine 323 identifies a set of feature vectors ("confusion feature set") that can be projected from both malicious apps 270 and benign apps 280 of the malware samples. The optimal pattern coverage engine 323 determines, for each feature vector of the confusion feature set, a corresponding confusion weight indicative of a number of benign apps 280 that can be projected to the feature vector. The more benign apps 280 that can be projected to a feature vector, the more difficult it is for malware detection techniques/models to detect a mutation with this feature vector as malicious.

Before generating mutations of a malware sample, the optimal pattern coverage engine 323 determines whether a resource feature R of the malware sample is present in a feature vector of a critical feature set, wherein the critical feature set is either a confusion feature set (i.e., if the mutations generated must reflect feature confusion) or an evolution feature set (i.e., if the mutations generated must reflect feature evolution). If the resource feature R is present in a feature vector V of the critical feature set, the optimal pattern coverage engine 323 mutates a feature vector of the resource feature R to be the same as the feature vector V by mutating contextual features. If the resource feature R appears in multiple feature vectors of the critical feature set, the optimal pattern coverage engine 323 mutates top K feature vectors ranked based on evolution or confusion weights. In one embodiment, K=10.

If the resource feature R is not present in any feature vector V of the critical feature set, the optimal pattern coverage engine 323 leverages a similarity metric to find another resource feature RO in the critical feature set that is most likely to be executed in the same context as resource feature R. The optimal pattern coverage engine 323 selects top K feature vectors (ranked based on evolution or confusion weights) matching the other resource feature RO as target vectors for mutation.

The similarity metric is based on a likelihood that two security-sensitive methods (i.e., resource features) reside in a same program basic block. For each security-sensitive method m appearing in the critical feature set, the optimal pattern coverage engine 323 counts a number $O_m$ of its occurrences in all mobile apps 260. Similarly, for another security-sensitive method n that appears at least once in the same program basic block as the method m, the optimal pattern coverage engine 323 counts a number $O_{mn}$ of co-occurrences of the methods m and n in the same program basic block. In one embodiment, a likelihood $S_{mn}$ that the method n is invoked under the same context as the method m is provided by equation (1) below:

$$S_{mn} = O_{mn}/O_m \qquad (1).$$

For any security-sensitive method n that does not appear in the critical feature set, the optimal pattern coverage engine 323 selects a security-sensitive method q that appears in the critical feature set and has a highest similarity score $S_{qn}$ (i.e., highest likelihood that the method q is invoked under the same context as the method n).

In one embodiment, the optimal pattern coverage engine 323 tests each mutation generated in the following manner: (1) apply a validation/program test to determine whether malicious behaviors of the original malware sample have been preserved, and (2) apply a conventional/traditional malware detection technique/model to determine robustness of the mutation (i.e., whether the malware detection technique/model detects the mutation as benign or malicious). A mutation that passes the validation/program test and evades detection (i.e., the malware detection model/technique does not detect the mutation as malicious) is a successful malware variant. Successful malware variants are used in training a classification model 330.

In the training phase, the inference engine 320 maintains a malicious app database 326 comprising the following: (1) one or more malicious apps 270, and (2) for each malicious app 270, one or more MRVs of the malicious app 270.

In the training phase, a learned feature model 325 is trained based on features of malicious behaviors triggered by malicious apps 270 and successful malware variants of the malicious apps 270. The feature model 325 facilitates discovery of potential new malware and potential malware variants. The feature model 325 generally reflects susceptibility of malware detection techniques/models to mutations of features of the malicious behaviors triggered by the malware samples. In the testing phase, in response to a new mobile app 260 on the client device 50, the feature model 325 may be used to extract features (i.e., contextual and essential features) of the new mobile app 260.

Invocation of malicious behaviors (and associated payload) may depend on conditions of malicious code execution (e.g., when a particular malicious behavior is triggered in certain context). For example, sending a SMS message may be identified as malicious behavior only if the sending is performed in the background stealthily without user notification and the SMS message includes sensitive, personal information (e.g., location, identify, etc). By comparison, sending an SMS message without any sensitive, personal information and with user notification may be identified as benign behavior (i.e., not malicious behavior). Based on this assumption, the feature model 325 leverages essential features of malicious behaviors (e.g., a security-sensitive method call) and contextual features of the malicious behaviors (e.g., when and where the method call is invoked).

In the training phase, a learned classification model 330 is trained based on features extracted from each malware sample (i.e., each malicious app 270 and each benign app 280). Further, to cover "blind spots" of malware detection techniques/models, the classification model 330 is trained based on features of successful malware variants generated by the optimal pattern coverage engine 323. In the testing phase, in response to a new mobile app 260 on the client device 50, the classification model 330 may be used to detect whether the new mobile app 260 is malicious or benign based on extracted features (i.e., contextual and essential features) of the new mobile app 260.

Figure 3:
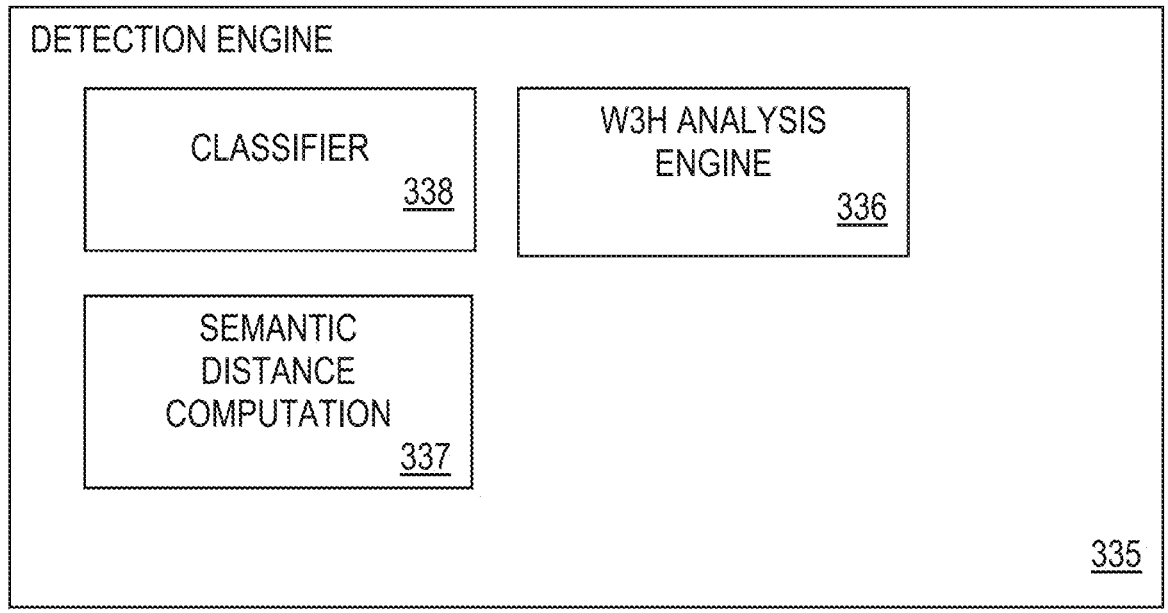
FIG. 3 illustrates an example detection engine, in one or more embodiments.

FIG. 3 illustrates an example detection engine 335, in one or more embodiments. In one embodiment, the detection engine 335 is online (i.e., resides on the client device 50). For example, the detection engine 335 may be a component of the malware detection system 200.

In the testing phase, the detection engine 335 is configured to detect whether a new mobile application 260 on the client device 50 is malicious or benign. Specifically, in response to a new mobile app 260 being fed to the detection engine 335, the detection engine 335 is configured to: (1) automatically assign the new mobile app 260 with a label/category indicating either the new mobile app 260 is benign or a malware family the new mobile app 260 belongs/corresponds to, and (2) automatically generate detection results comprising the assigned label/category. The detection results may be provided by a user interface displayed on the client device 50.

In one embodiment, the detection engine 335 comprises a W3H analysis engine 336. In the testing phase, the W3H analysis engine 336 utilizes a learned feature model (e.g., the feature model 325) to extract a set of multi-aspect features (i.e., resource features, locale features, temporal features, and dependency features) for the new mobile app 260.

In one embodiment, assume the new mobile app 260 has at least one feature that reflects an updated feature of a malware sample utilized during the training phase, and the new mobile app 260 operates in conformity with data flow of execution of the malware sample. To determine whether the new mobile app 260 is a mutation of the malware sample, the detection engine 335 determines whether an overall measurement of a set of features extracted for the new mobile app 260 satisfies a threshold of variation of an overall measurement of a set of features extracted for the malware sample.

In one embodiment, the detection engine 335 comprises a semantic distance computation unit 337. In the testing phase, the semantic distance computation unit 337 computes a distance between a new mobile app 260 and optimal coverage patterns determined during the training phase.

Let x denote a feature vector for a set of multi-aspect features extracted for the new mobile app 260, wherein $x=[x_1, x_2, \ldots, x_p]$, and p denotes a dimension of the feature vector x. Let y denote optimal coverage patterns learned during the training phase, and let i denote a malware sample utilized in the training phase. A distance between the new mobile app 260 and a malware sample i is provided in accordance with equation (2) provided below:

$$\text{Dist}(x, y_i) = sd\_x \& y_i \quad (2),$$

wherein $y_i$ denotes optimal coverage patterns learned during the training phase for a malware sample i, and wherein $sd\_x \& y_i$ denotes a semantic distance between x and $y_i$. The semantic distance $sd\_x \& y_i$ is defined based on a weighted sum over all attributes that is determined using the learned feature model.

In one embodiment, the detection engine 335 comprises a classifier 338. In the testing phase, the classifier 338 utilizes a learned classification model (e.g., the classification model 330), the set of multi-aspect features extracted, and the distance computed to assign the new mobile app 260 a label/category indicating either the new mobile app 260 is benign or a malware family the new mobile app 260 belongs/corresponds to. The classifier 338 generates detection results 290 comprising the assigned label/category.

Let argmin_denote an argument of a minimum. In one embodiment, a label/category for the new mobile app 260 is determined in accordance with equation (3) provided below:

$$\text{label}(x) = \text{argmin}\_k, \text{Dist}(x, y_i) \quad (3),$$

wherein x denotes a label/category assigned to k, wherein k denotes an argument/parameter for Dist(x, $y_i$) to attain smallest values, and wherein k further denotes a label/category of $y_i$. If the semantic distance $sd\_x \& y_i$ between the new mobile app 260 and any malware sample i is larger than a threshold, however, the new mobile app 260 is labeled with a new unknown label/category instead.

Figure 4:
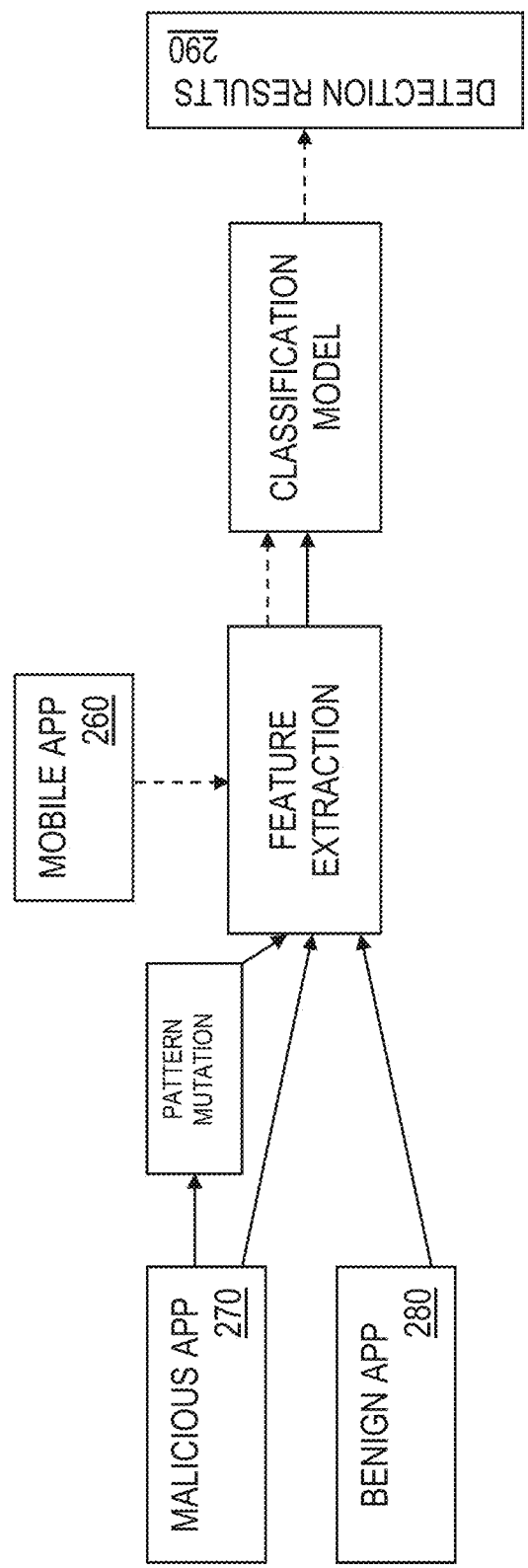
FIG. 4 illustrates an example pipeline of malware detection, in one or more embodiments.

FIG. 4 illustrates an example pipeline of malware detection, in one or more embodiments. As stated above, in the training phase (illustrated using solid arrows), malicious apps 270 are fed to the optimal pattern coverage engine 323 to generate mutations of the malicious apps 270. The mutations generated, the malicious apps 270, and benign apps 280 are fed to the W3H analysis engine 321 for feature extraction.

In a testing phase (illustrated using dashed arrows), a new mobile app 260 is fed to the W3H analysis engine 336 that utilizes a learned feature model (e.g., feature model 325) to extract features of the new mobile app 260. Based on the features extracted, the classifier 338 utilizes a learned classification model (e.g., classification model 330) to generate detection results 290 indicating whether the new mobile app 260 is benign or malware.

Figure 5:
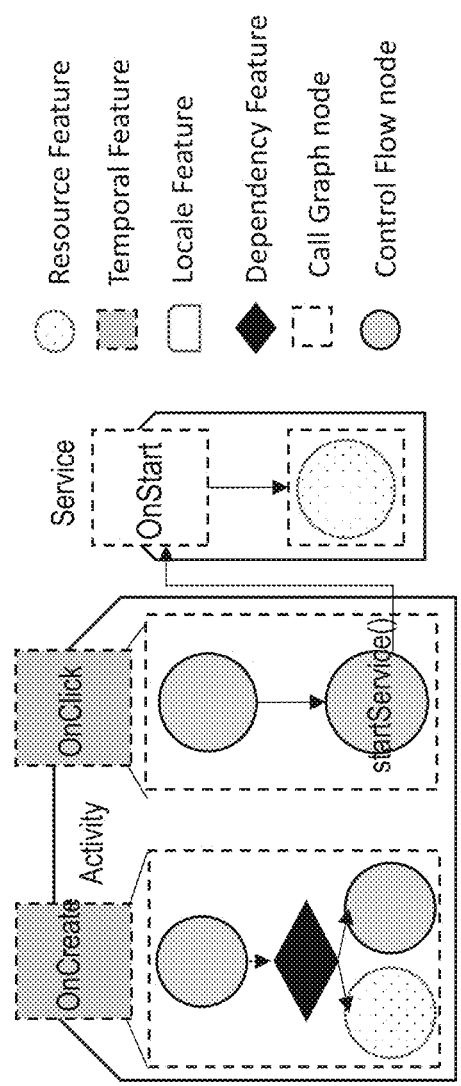
FIG. 5 illustrates example aspects, in one or more embodiments.

FIG. 5 illustrates example aspects, in one or more embodiments. As stated above, contextual and essential features of malicious behaviors may be categorized into at least four different aspects: resource features, temporal features, locale features, and dependency features.

Resource features identify security-sensitive resources (i.e., permission-protected resources such as storage, network communication, hardware controls, and system tools) exploited by malicious behaviors. For example, malware may use an Application Programming Interface (API) (e.g., an Android API) to access privileges or other sensitive information of security-sensitive resources. The feature model 325 may leverage static analysis techniques to find locations of API method invocations.

Malware may also circumvent a permission system to access security-sensitive resources. For example, malware may bypass a permission system by performing root exploit and command injection exploits. Via these exploits, the malware escalates privileges and performs other operations (e.g., turning the client device 50 into a botnet or installation of other malware). The feature model 325 may summarize methods used by the malware in these exploits (e.g., Runtime.exec, native methods, etc.), and use of these methods by static analysis may be identified.

Locale features identify a component of the client device 50 where malicious behaviors occur. Locale features may represent context factors that identify environmental attributes, such as calendar, system time, database, etc. For example, if an operating system of the client device 50 is Android, malicious behaviors may occur on an Android Component (e.g., a Service component, an Activity component, or a Broadcast Receiver component) or a concurrency construct (e.g., AsyncTask and Handler); the malicious behaviors are executed when the component or concurrency construct is activated. Due to inter-component communication (ICC) in a mobile app 260, an entry point component of a malicious behavior may be different from a component where the malicious behavior resides.

Locale features reflect visibility (i.e., whether execution of a task is in the foreground or background) and continuity (i.e., whether a task is executed only once or is continuously executed, even after a user 30 exits the mobile app 260). For example, if a task comprises using a permission in a Service component, the task is a continual task if it runs in the background indefinitely even after a user 30 exits a mobile app 260.

Temporal features identify when malicious behaviors are triggered. As described in detail later herein, in one embodiment, temporal features identify events triggering malicious behaviors. Events are a useful way to collect data about user interaction with interactive components of applications.

Dependency features identify how malicious behaviors are controlled. In one embodiment, dependency features identify control dependencies of invocation of malicious behaviors. A control dependency between a first statement and a second statement exists if a boolean value of the first statement controls whether the second statement is invoked. Dependency features may be generated from program dependence graphs (PDGs) obtained using static analysis of a mobile app 260.

Examples of multi-aspect features in an Android application program are shown in FIG. 5. OnCreate is an example Android operation that corresponds to a user interface (UI). OnClick is an example Android operation that corresponds to a button in a view of the UI. startService( ) is an example Android operation that may be called/invoked to start a service; once started, the service can run in the background indefinitely, even after a component that called/invoked startService( ) is destroyed. OnStart is an example Android operation that may be called/invoked when an activity becomes visible to a user 30.

Table 2 below provides example malicious code execution of a mobile app 260.

TABLE 2

```
//Toggle airplane mode
boolean planeMode = false;
void onClick( ) {
    planeMode = true;
}
void sendTextMessage(String text) {
    if (!planeMode) {
        android.telephony.SmsManager.getDefault( ).sendTextMessage(text);
    }
}
```

As shown in Table 2, invocation of sendTextMessage is controlled by a boolean value planeMode.

Malware may leverage external events or attributes to control malicious behaviors. For example, a malicious app 270 may leverage a current system time to control execution of its malicious payload. The malicious app 270 suppresses its malicious payload during a certain time period (e.g., in the day) but allows execution of its malicious payload at another time period (e.g., at late night) when a user 30 is likely sleeping. Usually, in malware detection, such dependencies are represented by external events or attributes that can affect control flows to the security sensitive behaviors.

For example, as shown in Table 2, a dependency of sendTextMessage is a click action that toggles the boolean value planeMode.

Figure 6:
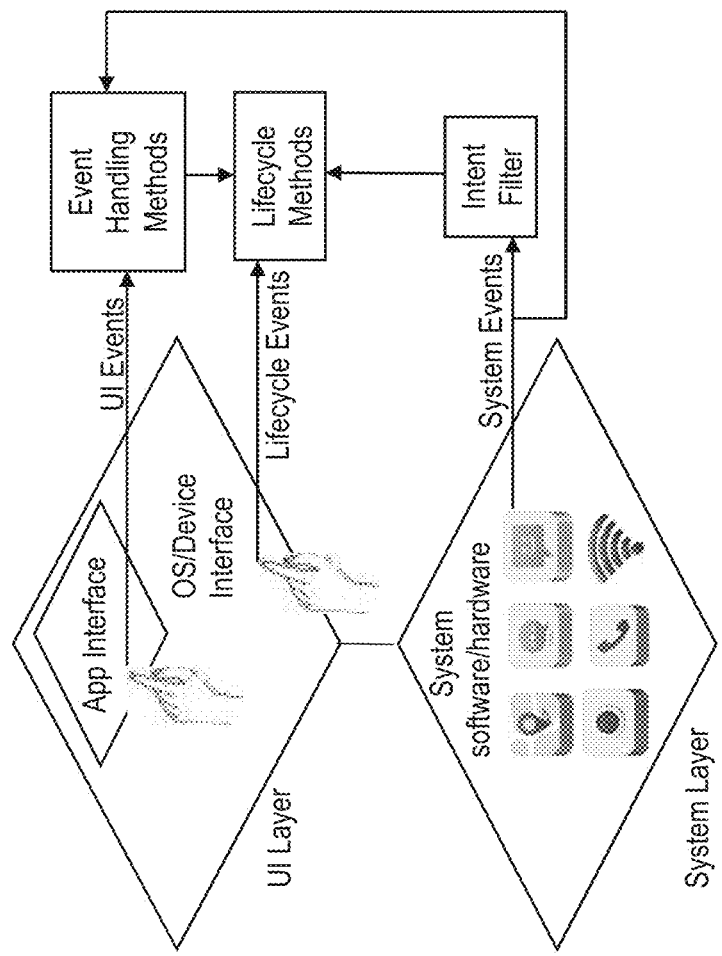
FIG. 6 illustrates examples events that may trigger malicious behaviors, in one or more embodiments.

FIG. 6 illustrates examples events that may trigger malicious behaviors, in one or more embodiments. Examples of events triggering malicious behaviors include, but are not limited to, system events, UI events, and lifecycle events.

A system event is initiated by a system state change (i.e., software or hardware) on the client device 50 (e.g., receiving SMS, re-booting, etc.) and is broadcasted to all mobile apps 260 residing on the client device 50. A mobile app 260 can register a broadcast receiver to receive a specific system event.

A UI event is triggered by user interaction on an application interface of a mobile app 260 (e.g., clicking a button or scrolling a list view). A mobile app 260 can register an event handler to receiver a UI event.

A lifecycle event is triggered by a user interaction on an operating system or device interface of the client device 50 (e.g., a user 30 pressing a HOME or BACK button) that can change a lifecycle of a component of the client device 50 (e.g., an Android component). A mobile app 260 may handle a lifecycle event by implementing a lifecycle method that corresponds to the lifecycle event. A lifecycle method, however, need not correspond to a lifecycle event. For example, a lifecycle method may be invoked in response to a system event or a UI event; in this case, activation events of permission uses may be classified as system events or UI events. Activation events are events that trigger malicious behaviors, such as signal strength changes. A defined lifecycle event may be handled by code in an underlying operating system rather than code in a mobile app 260.

Assume a mobile app 260 is fed to the W3H analysis engine 321 for W3H analysis. After disassembly analysis on the mobile app 260, the W3H analysis engine 321 extracts one or more security-sensitive methods from a software package of the mobile app 260. In order to determine where security-sensitive behaviors occur, the W3H analysis engine 321 generates one or more call graphs (CGs) to identify activation events.

Context factors are condition variables that will trigger malicious behaviors, such as environmental attributes that affect invocation of a security-sensitive behavior, current system time, etc. To extract context factors, the W3H analysis engine 321 utilizes ICC analysis to extract program contexts that may be used to identify an entry point for activation events and also connect control flows for context factors.

Figure 7:
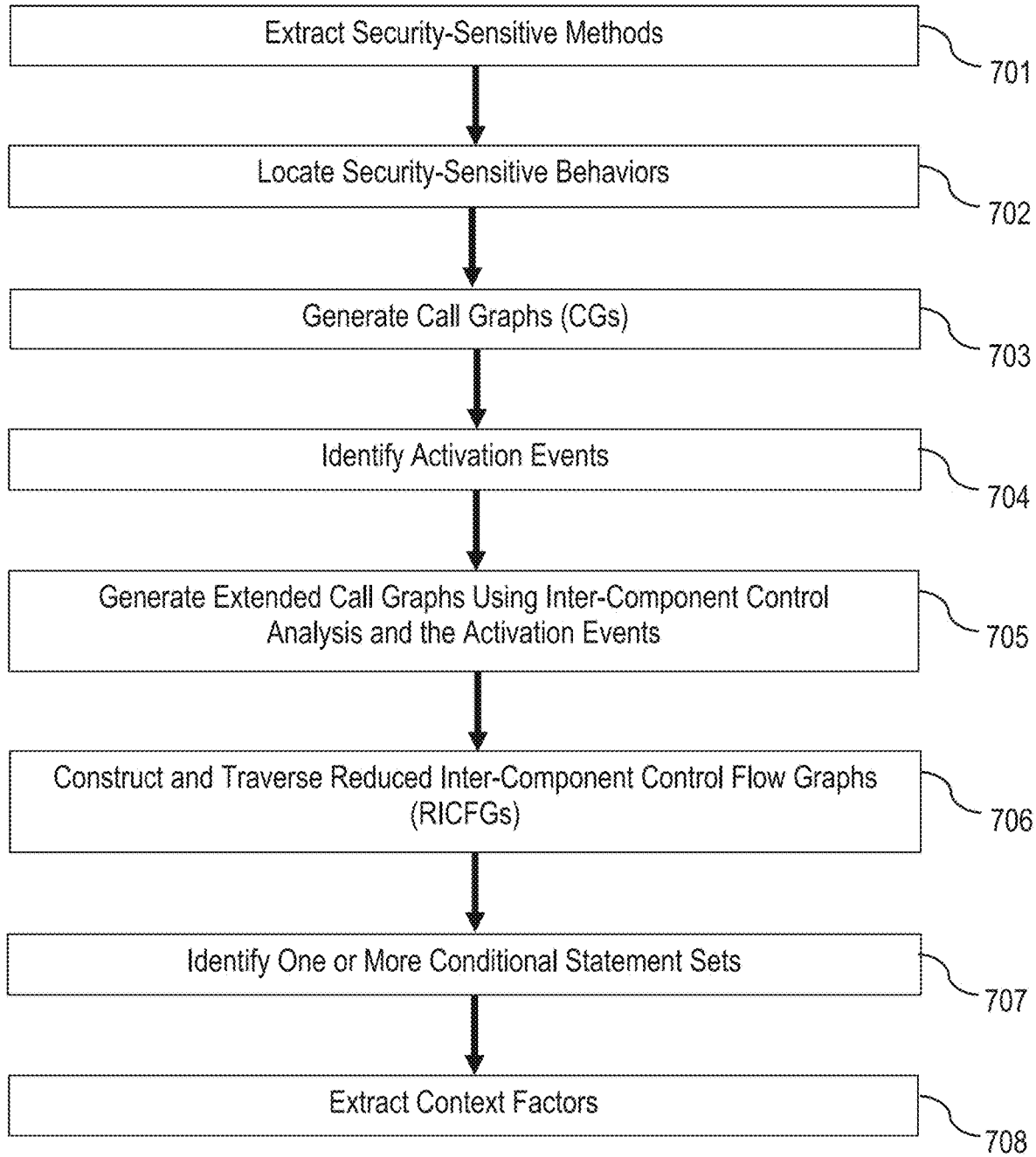
FIG. 7 is a flowchart of an example process for a what, where, when, and how (W3H) analysis, in one or more embodiments.

FIG. 7 is a flowchart of an example process 700 for W3H analysis, in one or more embodiments. In process 701, extract one or more security-sensitive methods from a software package of a mobile app. In process block 702, locate one or more security-sensitive behaviors. In process block 703, to locate one or more security-sensitive behaviors, generate one or more CGs. In process block 704, based on the CGs, identify one or more activation events. In process block 705, generate one or more extended call graphs (ECGs) utilizing ICC analysis and the activation events. In process block 706, construct and traverse one or more reduced inter-component control flow graphs (RICFGs). In process block 707, identify one or more conditional statement sets by traversing the RICFGs. In process block 708, extract one or more context factors by traversing the RICFGs.

In one embodiment, process blocks 701-708 may be performed by at least the W3H analysis engine 321.

Figure 8:
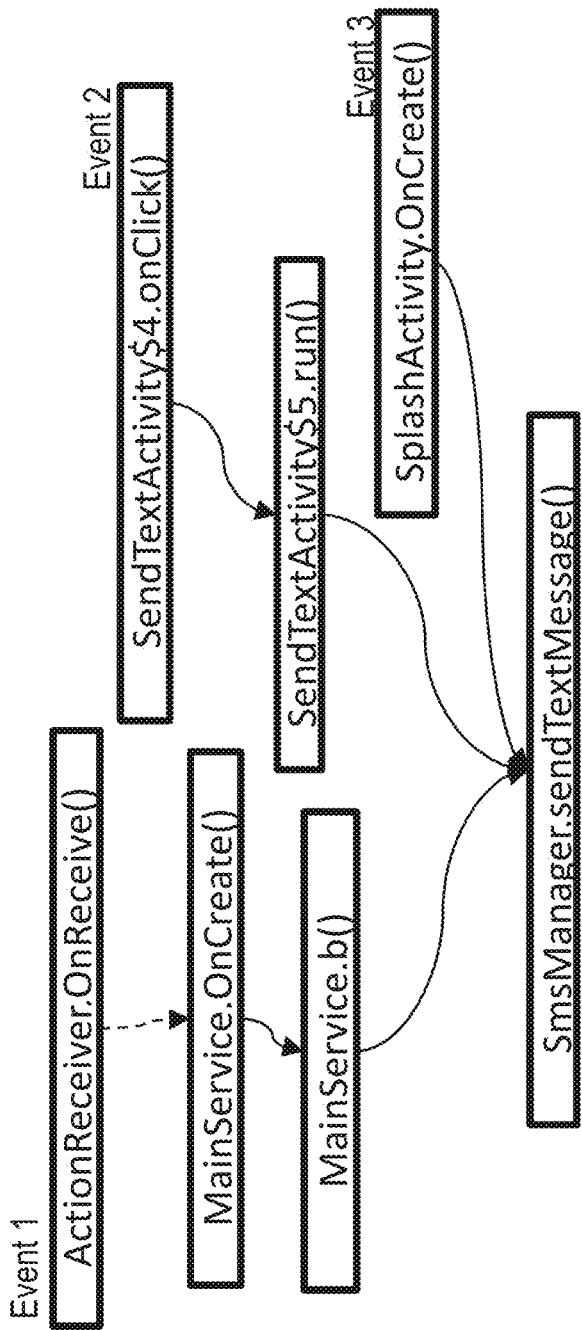
FIG. 8 illustrates example activation events, in one or more embodiments.

FIG. 8 illustrates example activation events, in one or more embodiments. Specifically, FIG. 8 shows the following activation events for SmsManager.sendTextMessage( ): (1) a first activation event ("Event 1") representing signal strength changes, (2) a second activation event ("Event 2") representing entering a mobile app 260, and (3) a third activation event ("Event 3") representing clicking a button.

Figure 9:
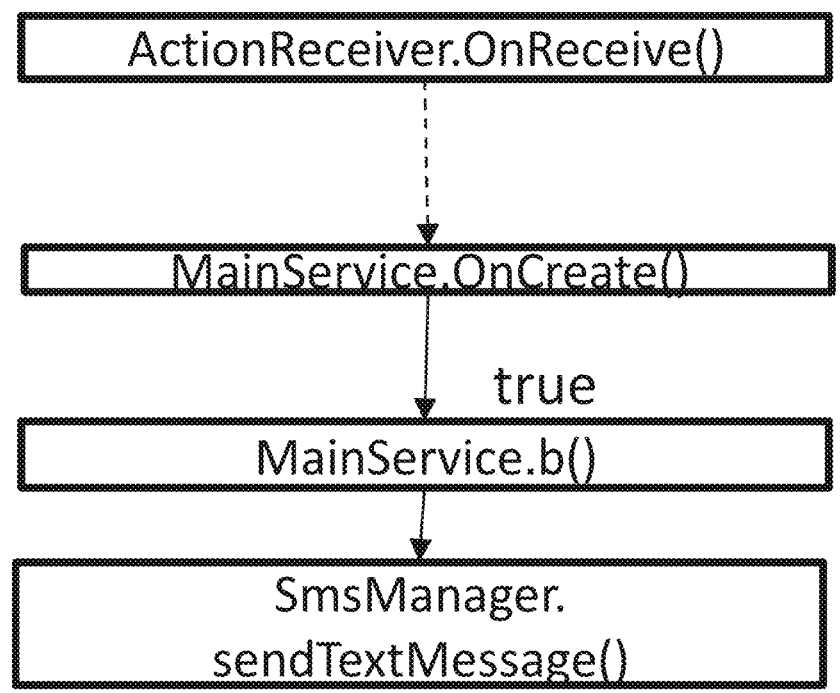
FIG. 9 illustrates an example reduced inter-component control flow graph (RIFCG) for an activation event in FIG. 8, in one or more embodiments.

FIG. 9 illustrates an example RIFCG 750 for an activation event in FIG. 8, in one or more embodiments. Specifically, FIG. 9 shows an example RIFCG 750 for Event 1 in FIG. 8 (i.e., signal strength changes). Each node of the RIFCG 750 represents a function. The RICFG 750 is traversed to identify conditional statement sets and extract context factors, such as when and where malicious behaviors are triggered, and how the malicious behaviors are triggered. The context factors extracted may include environmental attributes affecting invocation of security-sensitive behaviors.

Figure 10:
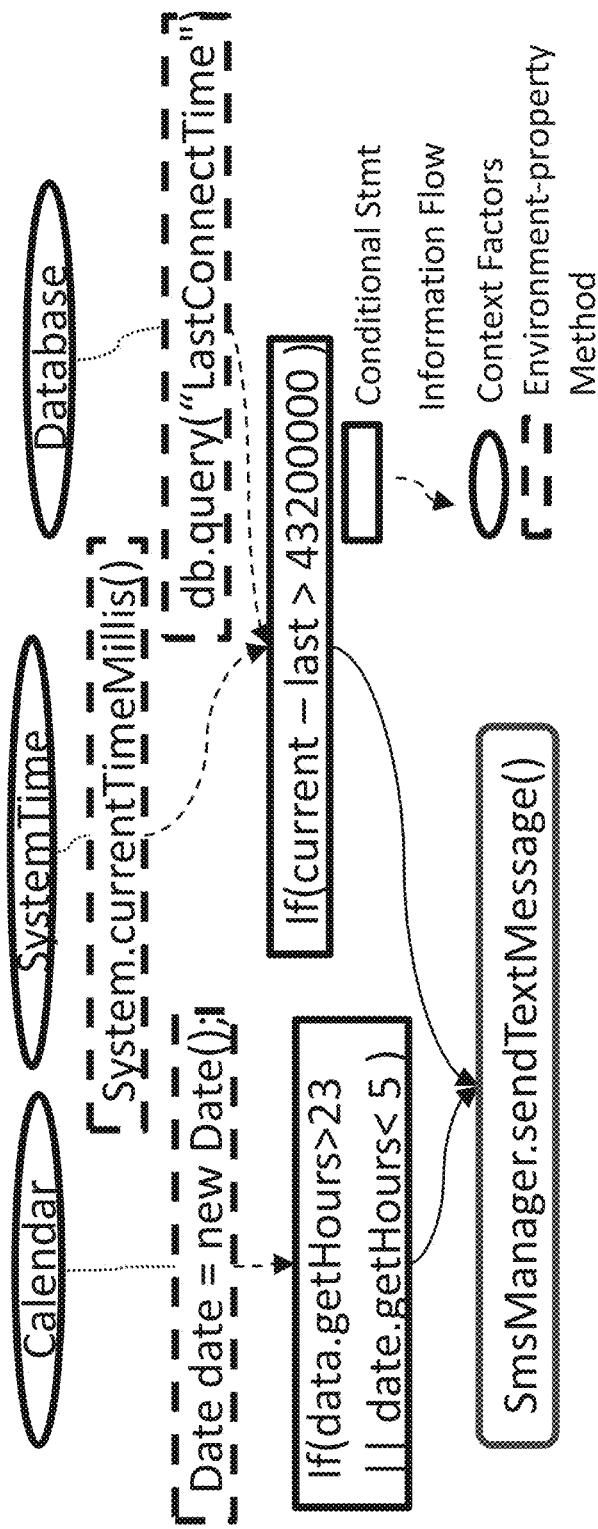
FIG. 10 illustrates how sensitive resources may be leaked in a mobile application via information flow analysis and W3H analysis, in one or more embodiments.

FIG. 10 illustrates how sensitive resources may be leaked in a mobile app 260 via information flow analysis and W3H analysis, in one or more embodiments. As shown in FIG. 10, the mobile app 260 invokes its behaviors (e.g., sending a SMS message) based on date, time, and last connection to a database. For example, the mobile app 260 suppresses its behaviors during a certain time period (e.g., in the day) but invokes its behaviors at another time period (e.g., at late night) when a user 30 is likely sleeping.

Figure 11:
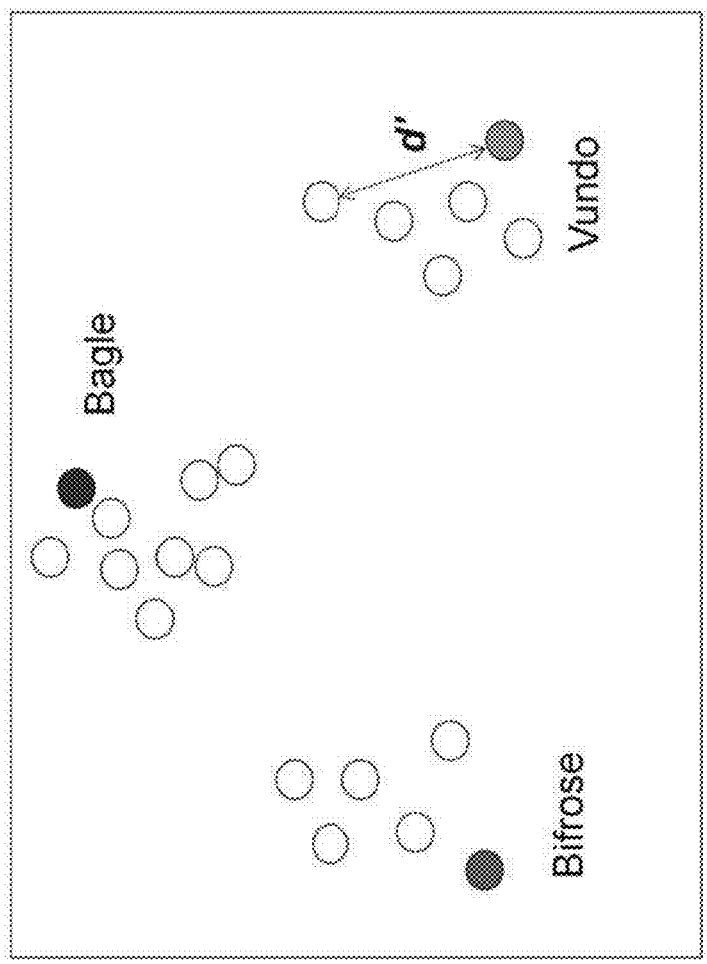
FIG. 11 illustrates example distances between different malware samples, in one or more embodiments.

FIG. 11 illustrates example distances between different malware samples, in one or more embodiments. Specifically, FIG. 11 illustrates malware samples belong to the following malware families: Bagle, Bifrose, and Vundo. Let d' denote an example distance between two malware samples belonging to the same malware family (e.g., Vundo).

Figure 12:
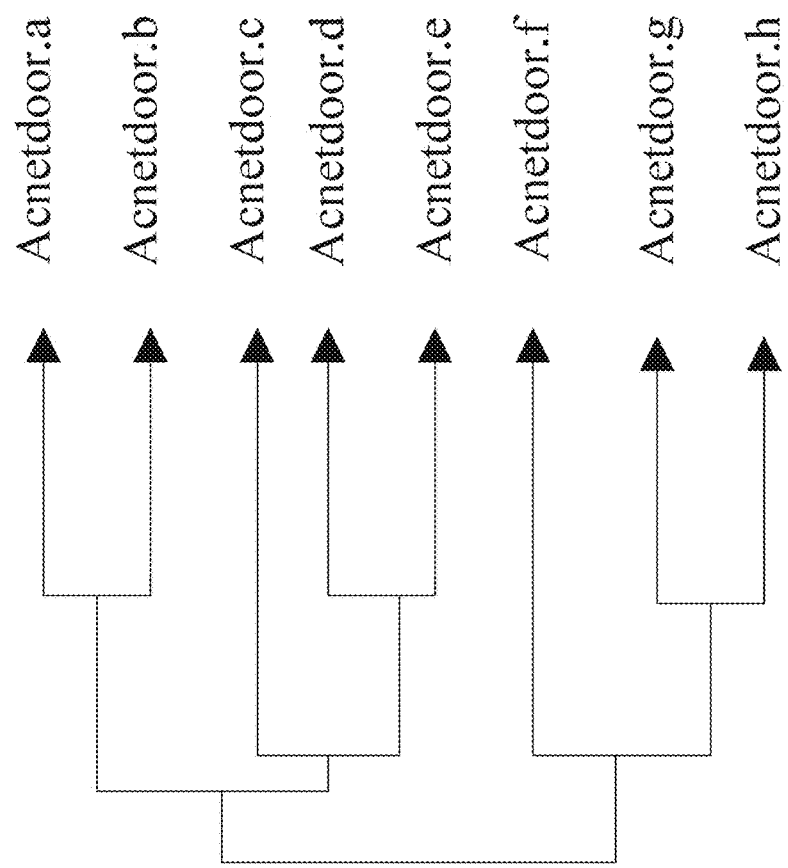
FIG. 12 illustrates an example phylogenetic tree for a malware family, in one or more embodiments.

FIG. 12 illustrates an example phylogenetic tree 760 for a malware family, in one or more embodiments. Specifically, FIG. 12 illustrates an example phylogenetic tree 760 for Acnetdoor, a Trojan malware family that infects an Android operating system. Malware belonging to Acnetdoor opens a backdoor on an infected client device 50 and sends an IP address of the client device 50 to a remote server. The phylogenetic tree 760 represents evolutions of a feature variable of the malware family. Each leaf of the phylogenetic tree 760 denotes a malware of the malware family.

FIG. 13 illustrates an example table 500 maintaining feature vectors for a malware sample and mutations of the malware sample, in one or more embodiments. Each row of the table 500 corresponds to either the malware sample or a mutation of the malware sample, and maintains a feature vector 510 for the corresponding malware sample/mutation. Each feature vector 510 comprises values for multi-aspect features of malicious behaviors triggered by a corresponding malware sample/mutation. The malware and its mutations belong to the same malware family.

FIG. 14 illustrates example feature vectors for a malware sample and mutations of the malware sample, in one or more embodiments. Assume the malware sample comprises a malicious app $M_1$ with feature vector [a, b, c], wherein a, b, and c are values for features $f_1$, $f_2$, and $f_3$ of the malicious app $M_1$, respectively. The optimal pattern coverage engine 323 mutates one or more of the features $f_1$, $f_2$, and $f_3$ to generate the following mutations: a malicious app $M_2$ with feature vector [a, b, c'] (i.e., value c for feature $f_3$ is mutated, for example, by flipping a corresponding bit), a benign app $B_1$ with feature vector [a', b, c'] (i.e., values a and c for feature features $f_1$ and $f_3$ are mutated), a malicious app $M_3$ with feature vector [a', b', c] (i.e., values a and b for feature features $f_1$ and $f_2$ are mutated), and a malicious app $M_v$ with feature vector [a', b', c'] (i.e., values a, b, and c for features $f_1$, $f_2$, and $f_3$ are mutated).

As shown in FIG. 14, detection results for the malicious app $M_2$ indicates the malicious app $M_2$ is benign; as the malicious app $M_2$ evades conventional/traditional malware detection techniques/models, the malicious app $M_2$ is a successful malware variant. Detection results for the malicious app $M_3$ indicates the malicious app $M_3$ is malware; as the malicious app $M_3$ does not evade malware detection techniques, the malicious app $M_3$ is an unsuccessful mutation.

Figure 15:
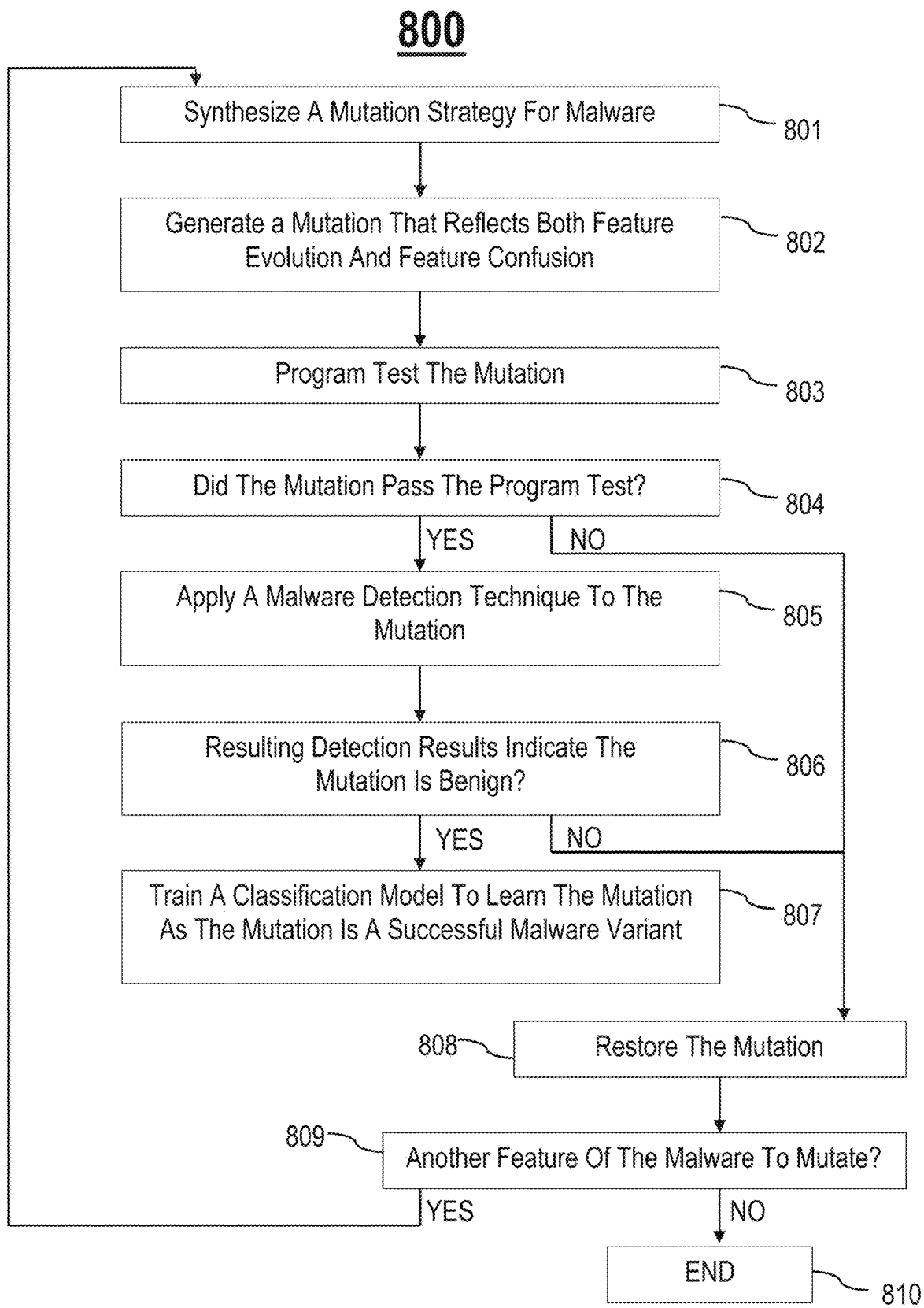
FIG. 15 is a flowchart of an example process for generating a mutation of a malware, in one or more embodiments.

FIG. 15 is a flowchart of an example process 800 for generating a mutation of a malware, in one or more embodiments. In process block 801, synthesize a mutation strategy for a malware. In process block 802, generate a mutation that reflects both feature evolution and feature confusion. In process block 803, program test the mutation to determine whether malicious behaviors of the malware have been preserved. In process block 804, determine whether the mutation passes the program test (i.e., whether the malicious behaviors of the malware have been preserved). If the mutation passes the program test, proceed to process block 805. If the mutation does not pass the program test, proceed to process block 808.

In process block 805, apply a malware detection technique to the mutation to determine robustness of the mutation (i.e., whether the malware detection technique detects the mutation as benign or malicious). In process block 806, determine whether resulting detection results indicate the mutation is benign. If the mutation is benign, proceed to process block 807. If the mutation is not benign, proceed to process block 808.

In process block 807, train a classification model to learn the mutation as the mutation is a successful malware variant.

In process block 808, restore the mutation by recovering the malware in its original form.

In process block 809, determine whether there is another feature of the malware to mutate (e.g., whether there is another resource feature RO that is most likely to be executed in a same context as resource feature R). If there is another feature to mutate, return to process block 801 to synthesize another mutation strategy for the recovered malware. If there is no other feature to mutate, proceed to process block 810 where the process ends.

In one embodiment, process blocks 801-810 are performed by at least one of the W3H analysis engine 321, the phylogenetic analysis engine 322, and the optimal pattern coverage engine 323.

Figure 16:
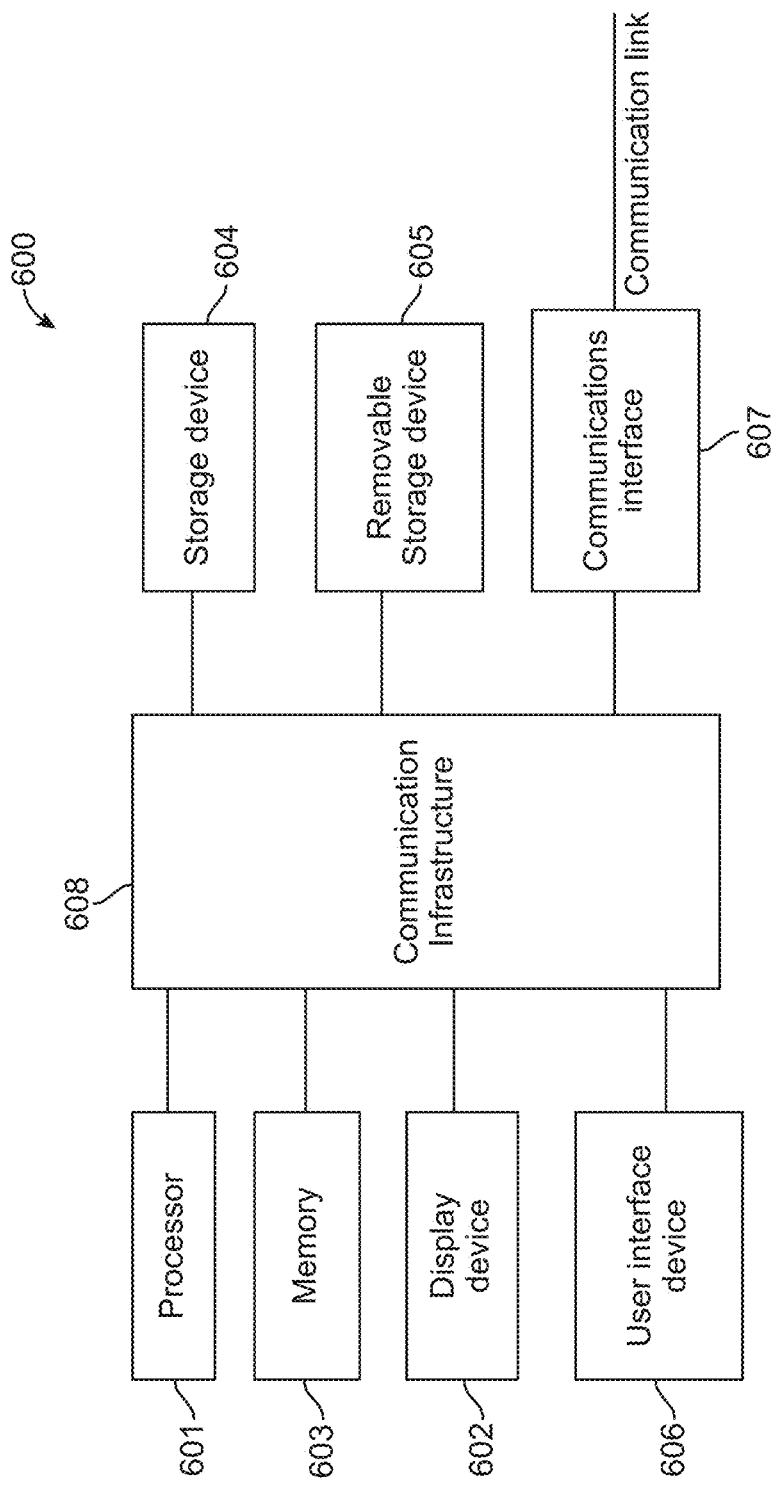
FIG. 16 is a high-level block diagram showing an information processing system comprising a computer system useful for implementing the disclosed embodiments.

FIG. 16 is a high-level block diagram showing an information processing system comprising a computer system 600 useful for implementing the disclosed embodiments. The system 600 may be incorporated in a client device 50 or a server device 210. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), viewer interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method comprising:
    receiving one or more malware samples;
    extracting one or more multi-aspect features of one or more malicious behaviors triggered by the one or more malware samples, wherein the one or more multi-aspect features are indicative of a context that the one or more malicious behaviors are triggered; determining one or more evolution patterns of the one or more malware samples based on the one or more multi-aspect features, wherein the one or more evolution patterns indicate one or more changes in the one or more multi-aspect features from one malware sample evolving to another malware sample; and
    generating one or more mutations of the one or more malware samples based on the one or more evolution patterns by transplanting the context that the one or more malicious behaviors are triggered to a different context, wherein the transplanting comprises adapting at least one code area within the one or more malware samples, the one or more mutations generated preserve the one or more malicious behaviors, the one or more mutations generated evade a conventional malware detection technique, and the one or more malware samples and the one or more mutations generated are used to detect malware.

2. The method of claim 1, wherein the one or more malware samples comprises at least one of a malicious application, a benign application, or a malware variant of the malicious application.

3. The method of claim 1, further comprising:
    maintaining a malicious application database comprising:
        one or more malicious applications; and
        for each malicious application of the one or more malicious applications, one or more malware re-composition variations (MRVs) of the malicious application, wherein each MRV is a mutation of the malicious application that preserves one or more malicious behaviors of the malicious application.

4. The method of claim 1, wherein extracting one or more multi-aspect features of one or more malicious behaviors triggered by the one or more malware samples comprises:
determining one or more resource features indicating at least one security-sensitive resource exploited by the one or more malicious behaviors based on static information flow analysis of the one or more malware samples.

5. The method of claim 1, wherein extracting one or more multi-aspect features of one or more malicious behaviors triggered by the one or more malware samples comprises:
determining one or more locale features indicating at least one device component where the one or more malicious behaviors occur based on static information flow analysis of the one or more malware samples.

6. The method of claim 1, wherein extracting one or more multi-aspect features of one or more malicious behaviors triggered by the one or more malware samples comprises:
determining one or more temporal features indicating when the one or more malicious behaviors are triggered based on static information flow analysis of the one or more malware samples.

7. The method of claim 1, wherein extracting one or more multi-aspect features of one or more malicious behaviors triggered by the one or more malware samples comprises:
determining one or more dependency features indicating how the one or more malicious behaviors are controlled based on static information flow analysis of the one or more malware samples.

8. The method of claim 1, wherein determining one or more evolution patterns of the one or more malware samples based on the one or more multi-aspect features comprises:
performing phylogenetic analysis of the one or more malware samples based on the one or more multi-aspect features, wherein the phylogenetic analysis comprises:
capturing at least one semantic distance between different malware samples by determining, for each feature variable, a corresponding number of operations required to transform one malware sample of the different malware samples into another malware sample of the different malware samples; and
for at least one malware family, constructing a corresponding phylogenetic tree based on the at least one semantic distance captured, wherein the corresponding phylogenetic tree comprises at least on feature variable representing at least one common feature of the malware family and a corresponding confidence value indicating a likelihood the at least one representative feature variable appears in a malware sample from the malware family.

9. The method of claim 1, wherein generating one or more mutations of the one or more malware samples based on the one or more evolution patterns comprises:
for each malware sample of the one or more malware samples:
synthesizing a mutation strategy for the malware sample;
generating one or more mutations of the malware sample by performing program transplantation to mutate one or more contextual features of one or more malicious behaviors triggered by the malware sample from one or more original values to one or more mutated values, wherein the one or more mutations of the malware sample generated preserve the one or more malicious behaviors triggered by the malware sample, and the program transplantation comprises identifying a code area within the malware sample to transplant, extracting the code area, identifying an insertion point in the code area, and adapting the code area at the insertion point; and testing each mutation of the malware sample generated to determine whether the mutation evades the conventional malware detection technique.

10. The method of claim 1, further comprising:
training a feature model for feature extraction based on multi-aspect features of each malware sample and each mutation generated.

11. The method of claim 1, further comprising:
training a classification model for detecting whether an application is malicious or benign based on multi-aspect features of each malware sample and each mutation generated that evades the conventional malware detection technique, wherein the malware is detected based on the classification model.

12. A system, comprising:
at least one processor; and
a non-transitory processor-readable memory device storing instructions that when executed by the at least one processor causes the at least one processor to perform operations including:
receiving one or more malware samples;
extracting one or more multi-aspect features of one or more malicious behaviors triggered by the one or more malware samples, wherein the one or more multi-aspect features are indicative of a context that the one or more malicious behaviors are triggered; determining one or more evolution patterns of the one or more malware samples based on the one or more multi-aspect features, wherein the one or more evolution patterns indicate one or more changes in the one or more multi-aspect features from one malware sample evolving to another malware sample; and
generating one or more mutations of the one or more malware samples based on the one or more evolution patterns by transplanting the context that the one or more malicious behaviors are triggered to a different context, wherein the transplanting comprises adapting at least one code area within the one or more malware samples, the one or more mutations generated preserve the one or more malicious behaviors, the one or more mutations generated evade a conventional malware detection technique, and the one or more malware samples and the one or more mutations generated are used to detect malware.

13. The system of claim 12, wherein the one or more malware samples comprises at least one of a malicious application, a benign application, or a malware variant of the malicious application.

14. The system of claim 12, wherein extracting one or more multi-aspect features of one or more malicious behaviors triggered by the one or more malware samples comprises at least one of:
determining one or more resource features indicating at least one security-sensitive resource exploited by the one or more malicious behaviors based on static information flow analysis of the one or more malware samples;
determining one or more locale features indicating at least one device component where the one or more malicious behaviors occur based on the static information flow analysis of the one or more malware samples;
determining one or more temporal features indicating when the one or more malicious behaviors are triggered based on the static information flow analysis of the one or more malware samples; and determining one or more dependency features indicating how the one or more malicious behaviors are controlled based on the static information flow analysis of the one or more malware samples.

15. The system of claim 12, wherein determining one or more evolution patterns of the one or more malware samples based on the one or more multi-aspect features comprises:

performing phylogenetic analysis of the one or more malware samples based on the one or more multi-aspect features, wherein the phylogenetic analysis comprises:

capturing at least one semantic distance between different malware samples by determining, for each feature variable, a corresponding number of operations required to transform one malware sample of the different malware samples into another malware sample of the different malware samples; and for at least one malware family, constructing a corresponding phylogenetic tree based on the at least one semantic distance captured, wherein the corresponding phylogenetic tree comprises at least on feature variable representing at least one common feature of the malware family and a corresponding confidence value indicating a likelihood the at least one representative feature variable appears in a malware sample from the malware family.

16. The system of claim 12, wherein generating one or more mutations of the one or more malware samples based on the one or more evolution patterns comprises:

for each malware sample of the one or more malware samples:

synthesizing a mutation strategy for the malware sample;

generating one or more mutations of the malware sample by performing program transplantation to mutate one or more contextual features of one or more malicious behaviors triggered by the malware sample from one or more original values to one or more mutated values, wherein the one or more mutations of the malware sample generated preserve the one or more malicious behaviors triggered by the malware sample, and the program transplantation comprises identifying a code area within the malware sample to transplant, extracting the code area, identifying an insertion point in the code area, and adapting the code area at the insertion point; and testing each mutation of the malware sample generated to determine whether the mutation evades the conventional malware detection technique.

17. The system of claim 12, further comprising:

training a feature model for feature extraction based on multi-aspect features of each malware sample and each mutation generated; and training a classification model for detecting whether an application is malicious or benign based on multi-aspect features of each malware sample and each mutation generated that evades the conventional malware detection technique, wherein the malware is detected based on the classification model.

18. A non-transitory computer readable medium that includes a program that when executed by a processor performs a method comprising:

receiving one or more malware samples;

extracting one or more multi-aspect features of one or more malicious behaviors triggered by the one or more malware samples, wherein the one or more multi-aspect features are indicative of a context that the one or more malicious behaviors are triggered; determining one or more evolution patterns of the one or more malware samples based on the one or more multi-aspect features, wherein the one or more evolution patterns indicate one or more changes in the one or more multi-aspect features from one malware sample evolving to another malware sample; and generating one or more mutations of the one or more malware samples based on the one or more evolution patterns by transplanting the context that the one or more malicious behaviors are triggered to a different context, wherein the transplanting comprises adapting at least one code area within the one or more malware samples, the one or more mutations generated preserve the one or more malicious behaviors, the one or more mutations generated evade a conventional malware detection technique, and the one or more malware samples and the one or more mutations generated are used to detect malware.

19. The non-transitory computer readable medium of claim 18, wherein the one or more malware samples comprises at least one of a malicious application, a benign application, or a malware variant of the malicious application.

20. The non-transitory computer readable medium of claim 18, wherein generating one or more mutations of the one or more malware samples based on the one or more evolution patterns comprises:

for each malware sample of the one or more malware samples:

synthesizing a mutation strategy for the malware sample;

generating one or more mutations of the malware sample by performing program transplantation to mutate one or more contextual features of one or more malicious behaviors triggered by the malware sample from one or more original values to one or more mutated values, wherein the one or more mutations of the malware sample generated preserve the one or more malicious behaviors triggered by the malware sample, and the program transplantation comprises identifying a code area within the malware sample to transplant, extracting the code area, identifying an insertion point in the code area, and adapting the code area at the insertion point; and testing each mutation of the malware sample generated to determine whether the mutation evades the conventional malware detection technique.

\* \* \* \* \*